United States Patent [19]

Koike

[11] Patent Number: 4,938,721
[45] Date of Patent: Jul. 3, 1990

[54] ALARM DEVICE FOR MARINE PROPULSION UNIT

[75] Inventor: Takashi Koike, Hamamatsu, Japan

[73] Assignee: Sanshin Kogyo Kabushiki Kaisha, Hamamatsu, Japan

[21] Appl. No.: 412,613

[22] Filed: Sep. 26, 1989

Related U.S. Application Data

[63] Continuation of Ser. No. 178,979, Mar. 21, 1988, abandoned.

[30] Foreign Application Priority Data

Mar. 20, 1987 [JP] Japan ............................ 62-66237

[51] Int. Cl.$^5$ ........................................... B63H 21/21
[52] U.S. Cl. ........................................... 440/2; 440/1; 440/87
[58] Field of Search ............................ 440/1, 2, 53, 87

[56] References Cited

U.S. PATENT DOCUMENTS

| | | | |
|---|---|---|---|
| 3,859,681 | 1/1975 | McVay et al. | 114/355 |
| 4,708,669 | 11/1987 | Kanno et al. | 440/1 |
| 4,776,818 | 10/1988 | Cahoon et al. | 440/53 |
| 4,822,307 | 4/1989 | Kanno | 440/2 |

Primary Examiner—Sherman D. Basinger
Assistant Examiner—Thomas J. Brahan
Attorney, Agent, or Firm—Ernest A. Buetler

[57] ABSTRACT

A number of embodiments of controls for marine propulsion units having two engines and propulsion systems with abnormal running control devices operated in response to abnormal engine conditions. The systems are interrelated so that when the control of the abnormally running engine is activated, the control of the normally running engine is also activated.

8 Claims, 9 Drawing Sheets

ALARM DEVICE FOR MARINE PROPULSION UNIT

This is a continuation of application Ser. No. 178,979, filed Mar. 21, 1988, now abandoned.

BACKGROUND OF THE INVENTION

This invention relates to an alarm device for marine propulsion units and more particularly to an improved and simplified alarm system for a marine propulsion system having plural engines and drive arrangements.

In many forms of marine application, there are provided pairs of driving engines and propulsion devices. In accordance with these systems, there are provided either warning or protection systems for each engine for either providing an operator warning or engine protection in the event of certain abnormal conditions. For example, if there is an overheating, lack of lubricant or some other abnormal condition, the engine may be protected by reducing its speed and/or an alarm may be given for the operator. However, with one engine malfunctioning and the other engine operating normally, the operator may not notice the warning signal and might continue to operate the watercraft at full speed. As a result, the abnormally running engine may be oversped by the passage of the water across its propeller and damage could result.

There has, therefore, been proposed a system in which either the warning indicators or engine protection circuits of both engines are activated in the event of a malfunction of either one of them. Such an arrangement is shown in U.S. Pat. No. 4,708,669, entitled "Warning Device For A Watercraft Provided With A Plurality Of Marine Propulsion Engines," issued Nov. 24, 1987 in the names of Isao Kanno et al and assigned to the assignee of this application. Although that system is particularly useful and advantageous, as the number of abnormal conditions sensed for the individual propulsion units increases, the complexity of the circuit for providing the warning signal and/or protection control for the normally running engine becomes very complicated and complex.

It is, therefore, a principal object of this invention to provide an improved and simplified warning device for a marine propulsion unit.

It is a further object of this invention to provide a simplified warning and protection arrangement for plural marine propulsion units wherein a wide variety of abnormal conditions are sensed.

SUMMARY OF THE INVENTION

This invention is adapted to be embodied in a control system for a marine propulsion comprising a first engine driving a first propulsion means and a second engine driving a second propulsion means. First and second sensing means are provided for sensing an abnormal running condition of the first and second engines, respectively. First and second protection means are operated by the respective first and second sensing means for providing protection for the respective engine in response to the sensing of an abnormal running condition of that engine. In accordance with the invention, means are provided for operating the protection means of the normally running engine in response to the operation of the protection means of the abnormally running engine.

DETAILED DESCRIPTION OF THE PREFERRED EMBODIMENTS

The Environment of the Invention

Figure 1:
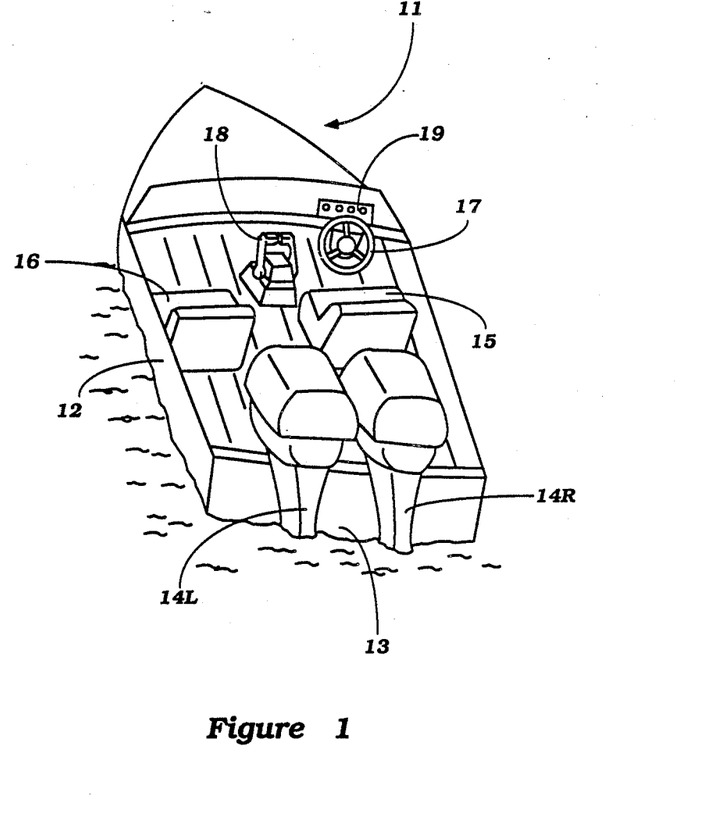
FIG. 1 is a perspective view of a watercraft powered by a propulsion system having a control device constructed in accordance with the invention.

Referring first to FIG. 1, a watercraft of the type with which the invention has utility is indicated generally by the reference numeral 11 and is comprised of a hull 12 having a transom 13. Mounted on the transom 13 are a pair of outboard motors 14L and 14R. Although the invention is described in conjunction with outboard motors, it is to be understood that the invention may be equally as well practiced with inboard/outboard drives of the type wherein each engine drives a separate propulsion device such as a propeller, jet drive or the like.

The hull 12 defines a passenger compartment or cabin in which an operator's seat 15 and a passenger seat 16 are positioned. A steering wheel 17 is positioned to the front of the operator's seat 15 for steering of the outboard motors 14L and 14R in any suitable manner. In addition, a combined throttle, transmission control mechanism 18 for controlling the individual engines 14L and 14R and their associated transmissions is juxtaposed to the operator's seat 15. A dash panel 19 is provided in front of the operator's seat 15 so as to afford the display of various information to the operator seated in the operator's seat 15 including the warning devices to be described.

Figure 2:
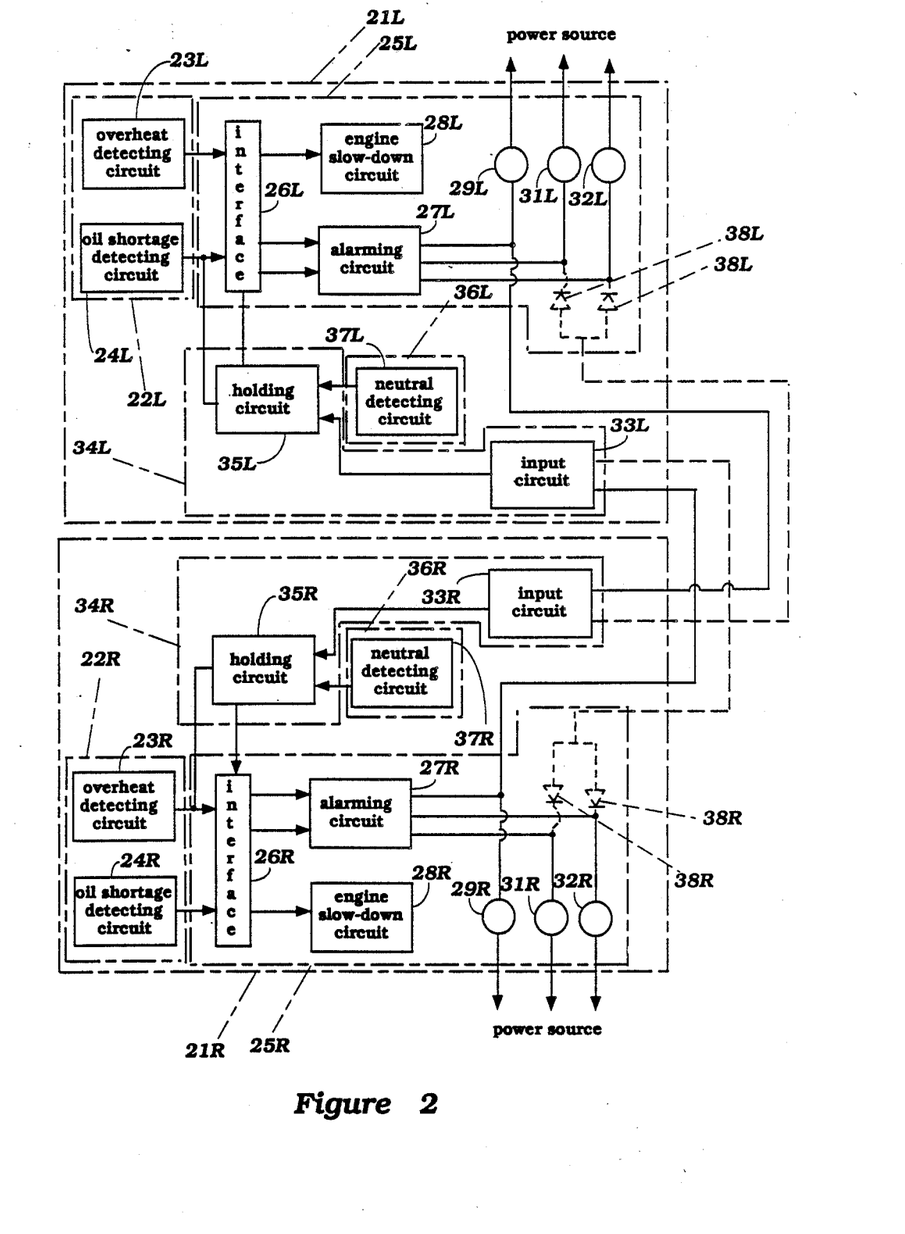
FIG. 2 is a block diagram showing the control system constructed in accordance with a first embodiment of the invention.
Figure 3:
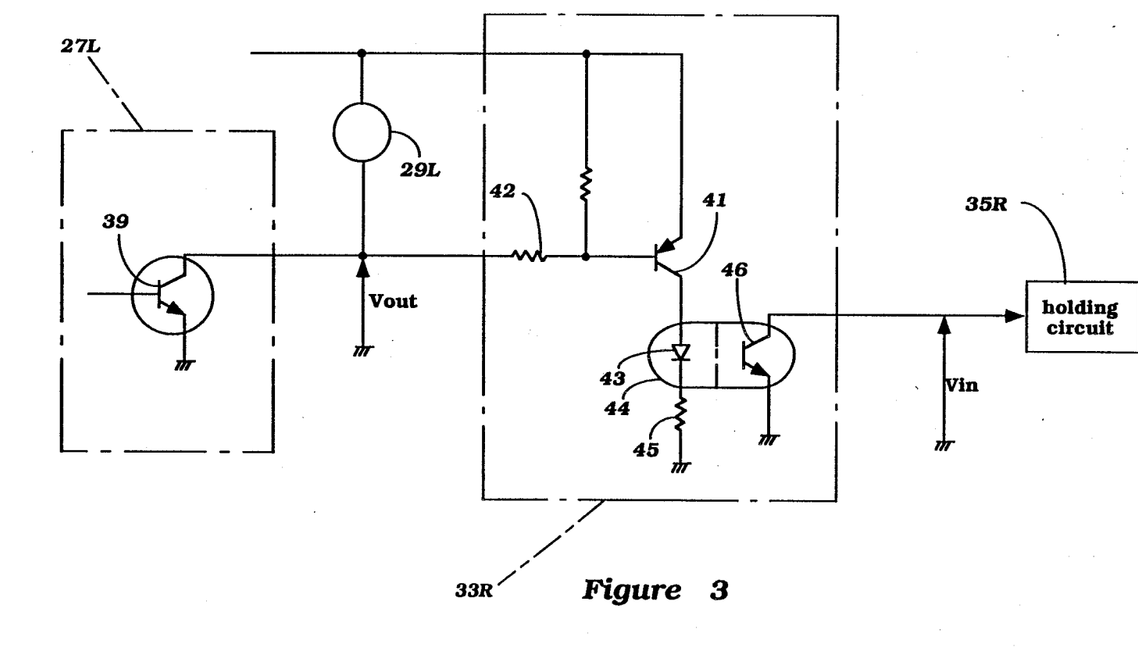
FIG. 3 is an electrical diagram showing the input circuit for one of the protection devices shown in the embodiment of FIG. 2.

Embodiment of FIGS. 2 and 3

In describing each of the embodiments of the invention, those components associated with the left and right outboard motors 14L and 14R which are the same have been identified by the same reference numeral and will be distinguished from each other by the suffix L for those components associated with the left hand outboard motor 14L and with suffix the R for those components associated with the right hand outboard motor 14R.

Each outboard motor is provided with a respective control arrangement 21L or R that contains an abnormal sensing arrangement 22L or R. Each abnormal sensing arrangement 22 is comprised of a plurality of abnormal condition detectors such as an overheating detector 23 or an oil level detector 24. It is to be understood that the number and types of detectors employed may be varied to suit a particular application or need.

The abnormal sensing arrangement 22 outputs a signal to a protection arrangement 25. The protection arrangement 25 is comprised of an interface 26 that receives the signals from the overheat detecting circuit 23 and oil level detecting circuit 24 and outputs the signals to an alarm circuit 27 and an engine protection control circuit 28. Depending upon the particular application, the sensing of either an overheating condition or an abnormally low oil condition can energize the engine protection circuit 28 which will have the effect of reducing the engine speed in order to ensure against damage in the event of overheating or low oil level. However, the engine that has the abnormal condition is not completely stopped. A system as shown in U.S. Pat. No. 4,708,669 may be that used for engine speed reduction.

In addition, the alarm circuit 27 outputs a signal to a plurality of indicators positioned in proximity to the operator and specifically on the dash panel 19. These indicators may take any form such as warning lights or warning buzzers or both and comprise an engine overhead buzzer 29, a low oil level indicator light 31 and an overheat indicator light 32.

The construction as thus far described may be considered conventional in that each engine or outboard motor is provided with its own respective protection warning and control arrangement for protecting the engine and providing a warning in the event of an abnormal running condition. In accordance with the invention, however, there is incorporated a system wherein the indication of an abnormal running condition of one of the engines is immediately transferred to the protection control of the other engine so as to provide a further warning to the operator. In accordance with this embodiment, in the event there is provided an indication of overheat by illumination of the overheating indicator buzzer 29R or L, the signal is transmitted immediately to an input circuit 33 of the protection control means for the other engine. The manner in which this signal is transmitted will be described later by particular reference to FIG. 3.

The input circuit 33 comprises part of a protection control circuit, indicated generally at 34 and which also includes a holding circuit 35. When the input circuit 33 receives an input signal of an abnormal condition from the abnormally running engine, it will activate the respective holding circuit 35 of the normally running engine and output a signal to its interface 26 which will activate the alarm circuit 28 and the engine slow down circuit 27 of the normal running engine. As a result, the warning indicator for the normal running engine will also be activated and the speed of this engine will be reduced so as to prevent damage to the abnormal running engine.

There is provided a release circuit 36 which may be responsive to certain engine or power unit running characteristics so as to permit resetting of the normal running engines so that it can be operated at full power after the abnormal running engine has been stopped and/or shifted into neutral. One way this can be done is by providing a neutral detecting circuit 37. The neutral detecting circuit 37 operates so that when the operator shifts the normal running engine into neutral, the holding circuit 35 is reset so that that engine can again be returned to full running speed. Of course there are other ways in which the resetting can be accomplished such as by reducing the throttle setting of the normal running engine or a variety of other conditions can be used for permitting resetting of the normal running engine so that it can be operated at full power. It is important, however, to provide a system that will ensure that the operator is aware of the abnormal running of the abnormally running engine.

In the embodiment of FIG. 2, the alarm circuit of the normal running engine was not activated unless the engine overheat buzzer was sensed and its warning device operated. However, it is possible to provide the same effect if the oil level lights 31 and/or overheat lights 32 are illuminated by providing circuits with diodes 38 that interconnect the lights 31 and 32 with the input circuit 33 of the normal running engine. The diodes 38 prevent illumination of one light merely upon illumination of the other light.

Referring now to FIG. 3, the system by which a signal may be transmitted from the abnormal running engine to the normal running engine is illustrated and will be described. In this Figure it is assumed that the abnormal running engine is the engine 14L and the normal running engine is the engine 14R. From this description it is believed that those skilled in the art will understand how the signal is transmitted in the opposite direction.

Each alarm circuit 27 includes a transistor 39 that has its state changed in response to the sensing of an engine overheating condition so as to activate the indicator buzzer 29 (the buzzer 29L in this instance). The input circuit 33 has a transistor 41 that is switched by means of applying voltage to a biasing resistor 42 so as to render the transistor 41 conductive when the light 29 is illuminated. This causes an LED 43 of an optical isolator 44 to be illuminated through a ground circuit including a resistor 45. When the LED 43 is illuminated a photo electric transducer 46 will be rendered conductive so as to activate the holding circuit 35R. In this way, signals can be transferred from the abnormal running engine to the normal running engine.

Figure 4:
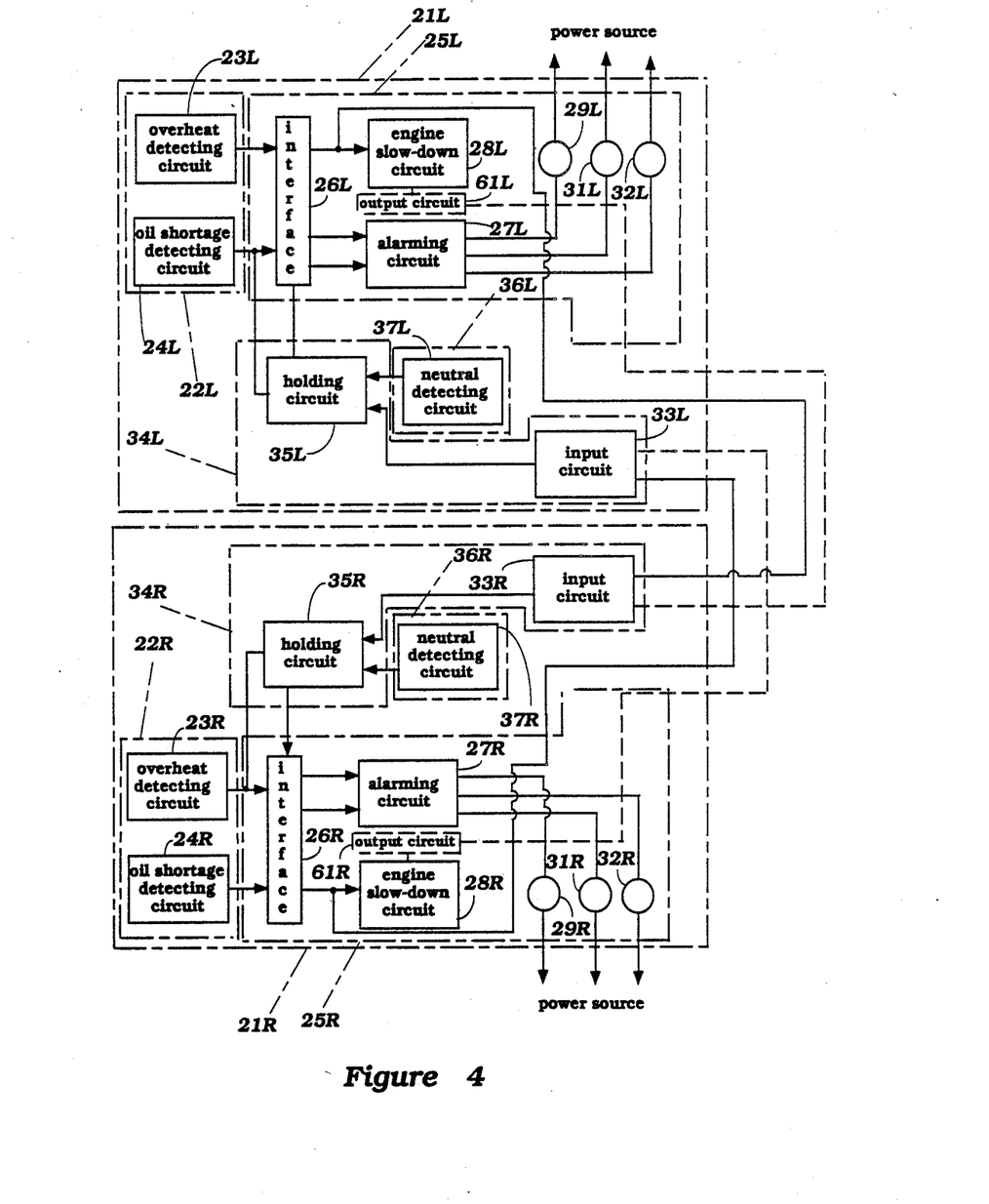
FIG. 4 is a schematic view, in part similar to FIG. 2, showing another embodiment of the invention.
Figure 5:
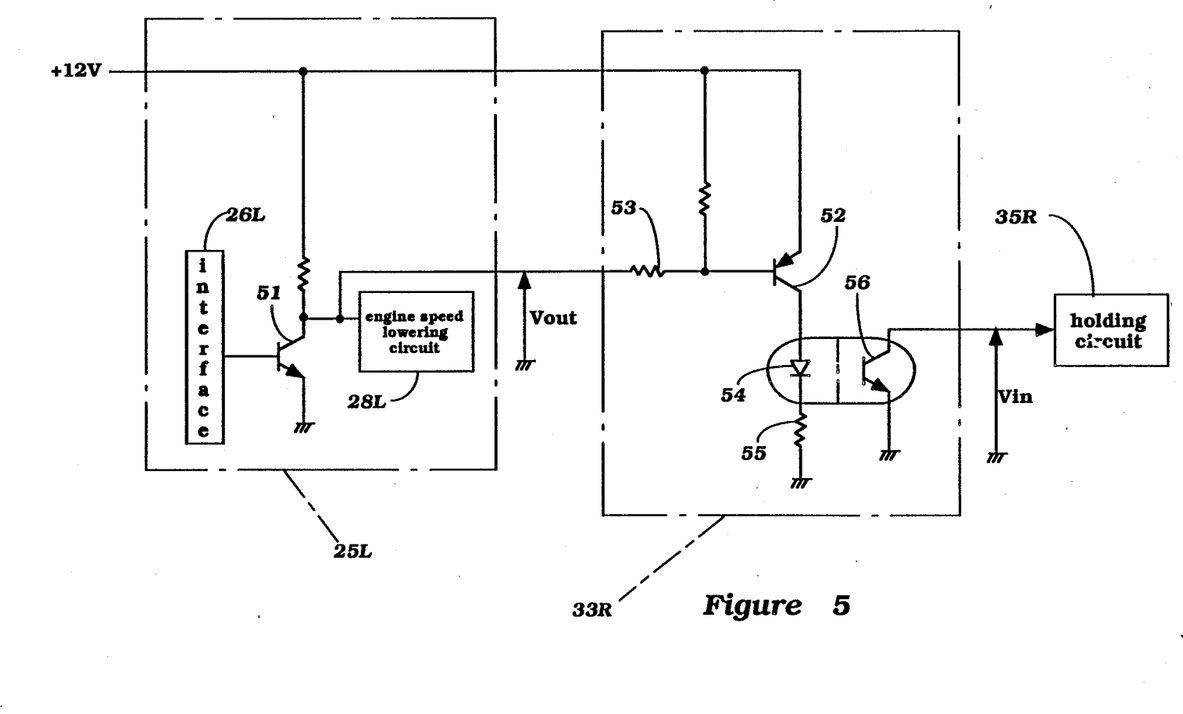
FIG. 5 is a circuit diagram for the embodiment shown in FIG. 4 showing the circuit connecting the input circuit and interface of one of the engine controls.

Embodiment of FIGS. 4 and 5

In the embodiment of FIGS. 2 and 3, the protection control of the normal running engine was activated by the sounding of the overheat detector buzzer 29. FIGS. 4 and 5 show another embodiment of the invention wherein the operation of the control circuit for the normal running engine is activated by the engine slow down circuit 28 and its operation rather than sounding of a warning buzzer. In all other regards, this embodiment is the same as the previously described embodiment and, for that reason, components which are the same as the previously described embodiment have been identified by the same reference numeral and will be described again only insofar as is necessary to understand the construction and operation of this embodiment.

Referring now specifically to FIGS. 4 and 5, when the interface 26 of the abnormal running engine outputs a signal to its engine slow down circuit 28R, this same signal is transmitted to the input circuit 33 of the normal running engine. FIG. 5 shows how this transmission occurs and in this figure it is assumed that the left engine 14L is the abnormal running engine and the engine 14R, the right engine, is the normal running engine.

When the interface 26 outputs a signal indicative of a condition that requires engine speed slowing, a transistor 51 is switched so as to be conductive and energize the engine speed lowering circuit 28L. At the same time, this signal is outputted to the base of a transistor 52 in the input circuit 33R through a biasing resistor 53 to switch the transistor 52 on. This illustrates an LED 54 of an optical isolator 55 which, in turn, switches a transistor 56 that activates the holding circuit 35R to operate the engine slow down circuit of the normally running engine.

Rather than providing the output signal for the normal engine input circuit 33 from the input to the engine slow down circuit 28, it is also possible to provide an output circuit 61 as shown in the broken line view of FIG. 4, which outputs a signal to the input circuit 33 of the normally running engine when the engine slow down circuit 28 of the abnormally running engine is activated.

Figure 6:
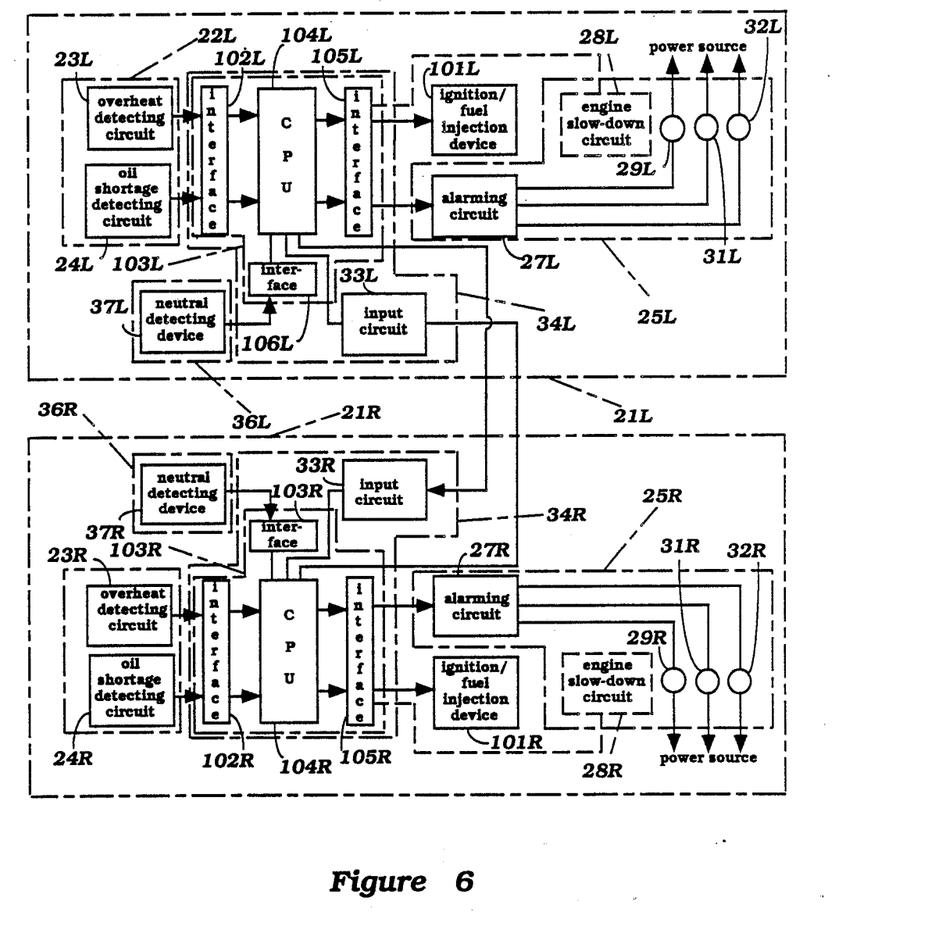
FIG. 6 is a block diagram, in part similar to FIGS. 2 and 4, showing yet another embodiment of the invention.
Figure 7:
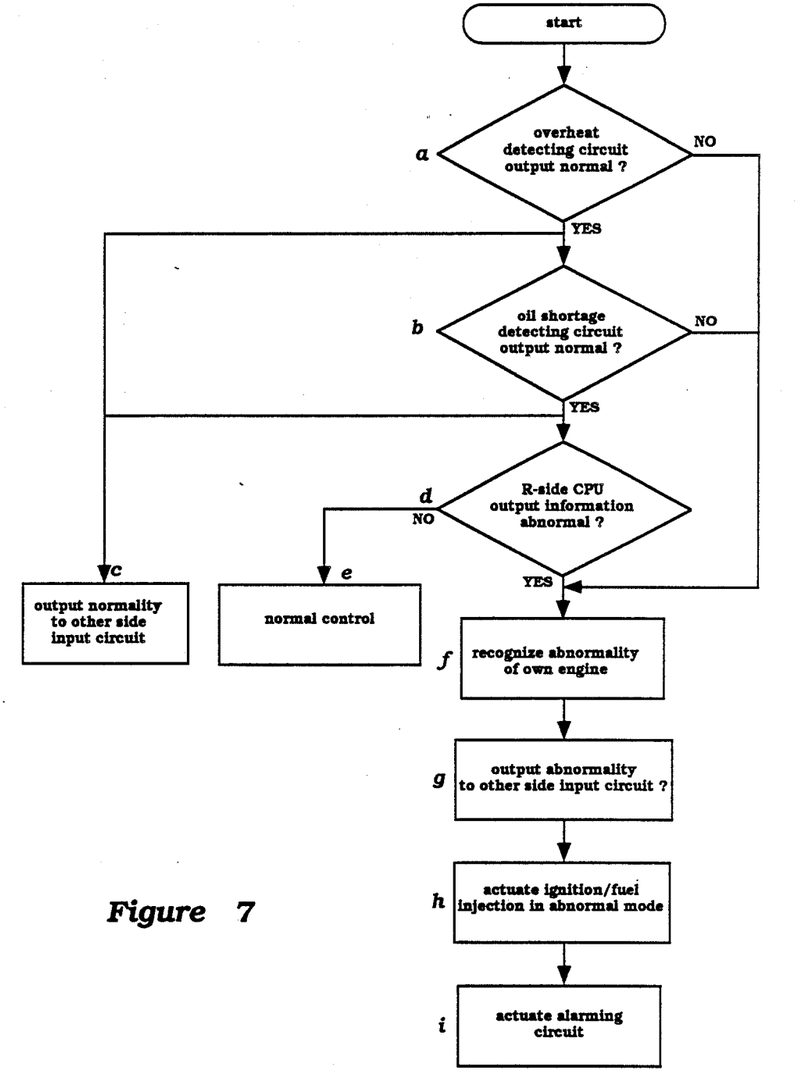
FIG. 7 is a flow or block diagram showing the logic of the embodiment of FIG. 6.
Figure 8:
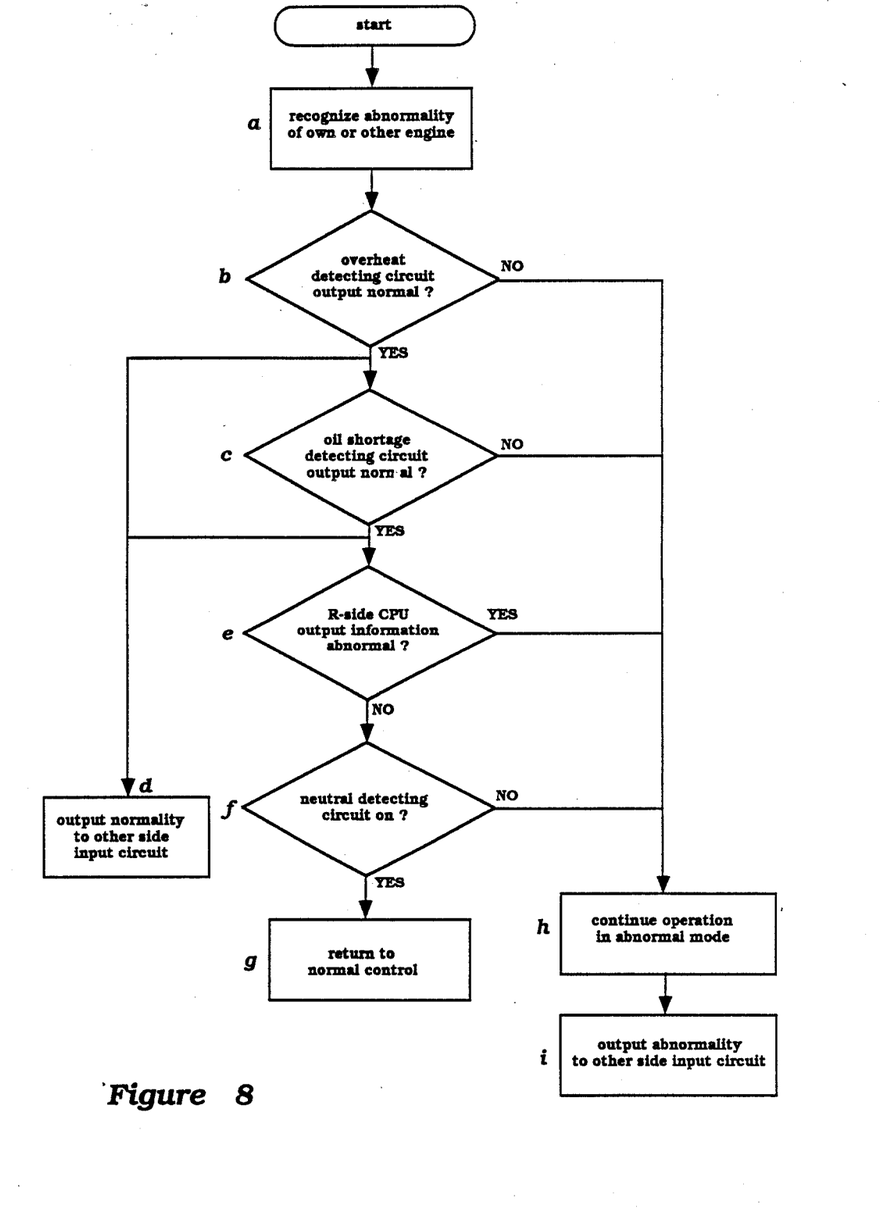
FIG. 8 is a flow chart showing another operation of the embodiment of FIG. 6.

Embodiments of FIGS. 6 through 8

In the embodiments as thus far described there have been provided discreet circuits wherein the signal which is applied to either the indicating circuit or the speed reduction circuit, such circuits being referred to as protection control circuits. These input circuits have been activated in response to the initiating signal. FIG. 6 shows an embodiment which has the same basic components of the previously described embodiment but which uses a CPU for transmitting the signals and which CPU can be programmed to operate in a number of different manners, as will be described.

In this embodiment, many of the components are the same as the previously described components and, for that reason, those components have been identified by the same reference numerals and will not be described again except insofar as is necessary to understand the construction and operation of this embodiment.

In the previously described embodiments, the engine slowdown circuit 28R has operated on the engine ignition system in order to achieve slow down in the manner as described in U.S. Pat. No. 4,708,669. This is perfectly satisfactory for many applications but FIGS. 6 through 8 show an embodiment wherein the engine is provided with an ignition system and a fuel injection system, indicated generally by the reference numeral 101 and in this embodiment the slow down circuit 28 operates on either the ignition system, as aforedescribed, or the fuel injection circuit 101 so as to reduce the amount of fuel and thus slow the engine. As a result, this embodiment has utility in connection with diesel engines which do not have ignition systems. Also, the invention can be utilized in conjunction with controls for the throttle valve of an internal combustion engine of either the spark or diesel type.

In this embodiment, the overheat detecting circuit 23 and oil level detecting circuits 24 output their signals to an interface 102 of a computer control circuit 103. The interface 102 outputs signals to a CPU 104 which, in turn, is programmed in a manner to be described and outputs signals to an interface 105 in the event of abnormal condition. The interface 105, in turn, outputs its signals to the alarm circuit 27 for sounding the buzzer 29 and illuminating the indicators 31 and 32 and also to the ignition and fuel injection system 101 for controlling the amount of fuel injection. The CPU's 104 also send and receive signals to and from the input circuits 33 so as to transmit these signals from the normal running engine to the abnormal running engine. An interface 106 also transmits signals from the reset device such as the neutral detecting circuit 37 back to the CPU 104 of the normal running engine so as to permit it to be operated in a normal manner.

This embodiment operates according to a system in which the CPU's 104 directly communicate with the input circuits 33 of the normal running engines will be described in conjunction with FIG. 7.

When the program is started at the step a the CPU 104 of each engine determines if there is an output from the overheat detecting circuit 23. If there is not, the program moves to the step f. If, however, there is the indication of an overheat condition for either engine, the program moves to the step c so as to output an indication of normality to the input circuit 33 of the normally running engine.

Once the procedures at the step a have been completed, the program moves to the step b to determine if the oil level detecting circuit 24 has output a signal. If it has not, the program moves to the step f. If, however, there is an oil level detection signal indicative of an abnormality, the program moves to the step c so as to output a signal to the normal running engine.

Once the overheat and oil level detections have been completed, the program moves to the step d to determine if there has been received a signal from the other engine which indicates that it is running in an abnormal condition. If not, the program moves to the step e to continue normal control. If, however, there is an output signal from the other engine also indicating an abnormal condition, the program moves to the step f to determine if the abnormality signal which has been received is that of the engine with which the CPU 104 is associated.

The program then moves to the step g to determine if the abnormality is of its own engine has been transmitted to the input circuit 33 of the other engine.

The program then moves to the step h so as to reduce the engine speed by activating either the ignition or fuel injection into the abnormal speed reducing mode and also to the step i to activate the alarm circuit.

FIG. 8 shows a block diagram of the program that describes how the engine, of the normally running side, can be returned to its normal condition. Referring to this figure, at the step a, there is a determination made to determine if the abnormality is of the engine with which the CPU 104 is associated or that of the other engine. The program then moves to the step b to determine if the overheat detecting circuit 23 has a normally output. If it does not, the program moves to the step h to continue operation in the abnormal mode and at the step i to output the abnormality signal to the other side input circuit 33.

If, however, the engine overheat detecting circuit 24 is outputting a normal signal, this information is transmitted at the step d to the other side input circuit and the program then moves to the step c to determine if the oil level detecting circuit 24 is outputting a normal signal. If it is not, the program moves to the step h again to continue operation in the abnormal mode and also to output an indication of the abnormality to the other side input signal 33 at the step i.

If, however, the oil level detecting circuit 24 indicates a normal oil level, the program outputs a signal of this normality at the step d to the other side input circuit 33 and also then moves to the step e to determine if the information of the engine is abnormal. If it is, the program again moves to the steps h and i so as to continue operation in the normal running condition. If, however, there is no indication of abnormality, the program moves to step f to determine if the neutral detecting or resetting circuit 36 or 37 have been reset. If they have not, the program continues at the steps h and i for abnormal running conditions. If, however, the reset circuit has been reset the program moves to the step g so as to permit running of the engine at normal speeds since now it will have been known that the operator is aware of the defect, has protected the abnormally running engine by stopping it and/or shifting it into neutral and has made the mental determination that he wishes to respeed the normal running engine.

Figure 9:
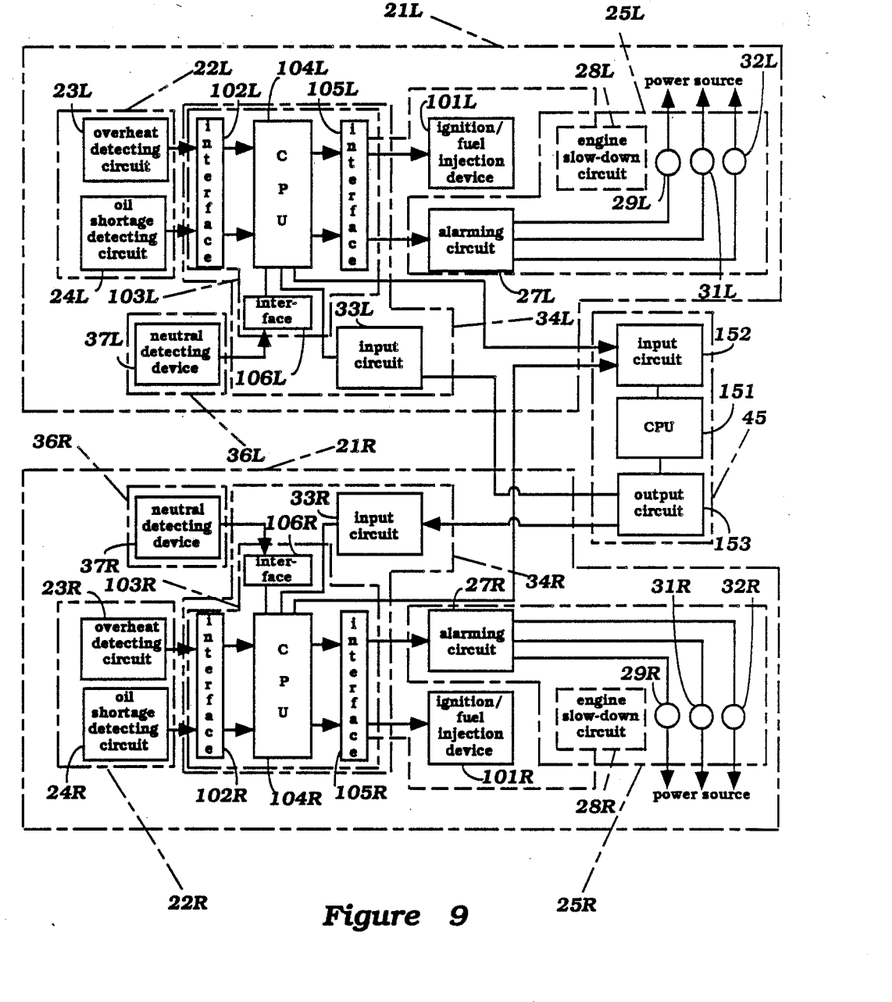
FIG. 9 is a block diagram, in part similar to FIGS. 2, 4 and 6 and shows another embodiment of the invention.

Embodiment of FIG. 9

FIG. 9 shows an embodiment that is generally similar to the embodiment of FIG. 6. This embodiment may also operate on the routines as described in conjunction with the embodiment of FIG. 6. However, in this embodiment communications between the input circuits 33 of the two outboard motors are controlled by a separate CPU 151 having an input circuit 152 that receives signals from the CPUs 104 of the respective motors. The CPU 151 also has an output circuit 153 that outputs signals from this CPU to the input circuits 33 so as to achieve the aforedescribed controls. In all other regards, this embodiment is the same as the previously described embodiments and, for that reason, further description of it is not believed to be necessary.

SUMMARY

In view of the foregoing, it is believed that a number of the embodiments of the invention have been illustrated and described and each of which provides a wide variety of abnormal signals to be transmitted from a normally running engine to an abnormally running engine for providing both warning and protection control signals. Although a number of embodiments have been illustrated and described, various changes and modifications may be made without departing from the spirit and scope of the invention as defined by the appended claims. For example, in the disclosure, reference has been made to sensing a low oil level condition as may be used with two cycle engines, however, the system may be used with low oil pressure sensors as may be used with four cycle engines. Other warning sensors may also be employed.

What is claimed is:

1. A control system for a marine propulsion comprising a first engine, first propulsion means driven by said first engine, a second engine, second propulsion means driven by said second engine, first sensing means for sensing an abnormal running condition of said first engine, first alarm operating means, second sensing means for sensing an abnormal running condition of said second engine, second alarm operating means, first control means operated by said first sensing means for providing a control for said first alarm operating means to give and alarm and a control for said first engine in response to the sensing of an abnormal running condition of said first engine, second control means operated by said second sensing means for providing a control for said second engine in response to the sensing of an abnormal running condition of said second engine, the improvement comprising means for operating the control means of the normally running engine in response to the operation of the alarm operating means of the abnormally running engine.

2. A control system as set forth in claim 1 wherein the means for operating the control means of the normally running engine in response to the operation of the alarm operating means of the abnormally running engine receives the same output from the sensing means of the abnormally running engine.

3. A control system as set forth in claim 1 wherein the means for operating the control means of the normally running engine operates the control means of the normally running engine from the same signal applied to the alarm operating means of the abnormally running engine.

4. A control system as set forth in claim 1 wherein the means for operating the control means of the normally running engine is operative in response to a means for detecting operation of the alarm operating means of the abnormally running engine.

5. A control system as set forth in claim 1 wherein there are a plurality of first sensing means for sensing a plurality of different abnormal running conditions of the first engine and a plurality of second sensing means for sensing a plurality of abnormal running conditions of the second engine.

6. A control system as set forth in claim 1 wherein the control means comprises means for running the engine at a reduced output.

7. A control system as set forth in claim 6 wherein the reduced output is achieved by interrupting the engine ignition.

8. A control system as set forth in claim 6 wherein the running speed of the engine is reduced by reducing the fuel supply to the engine.

* * * * *